United States Patent Office 3,155,260
Patented Nov. 3, 1964

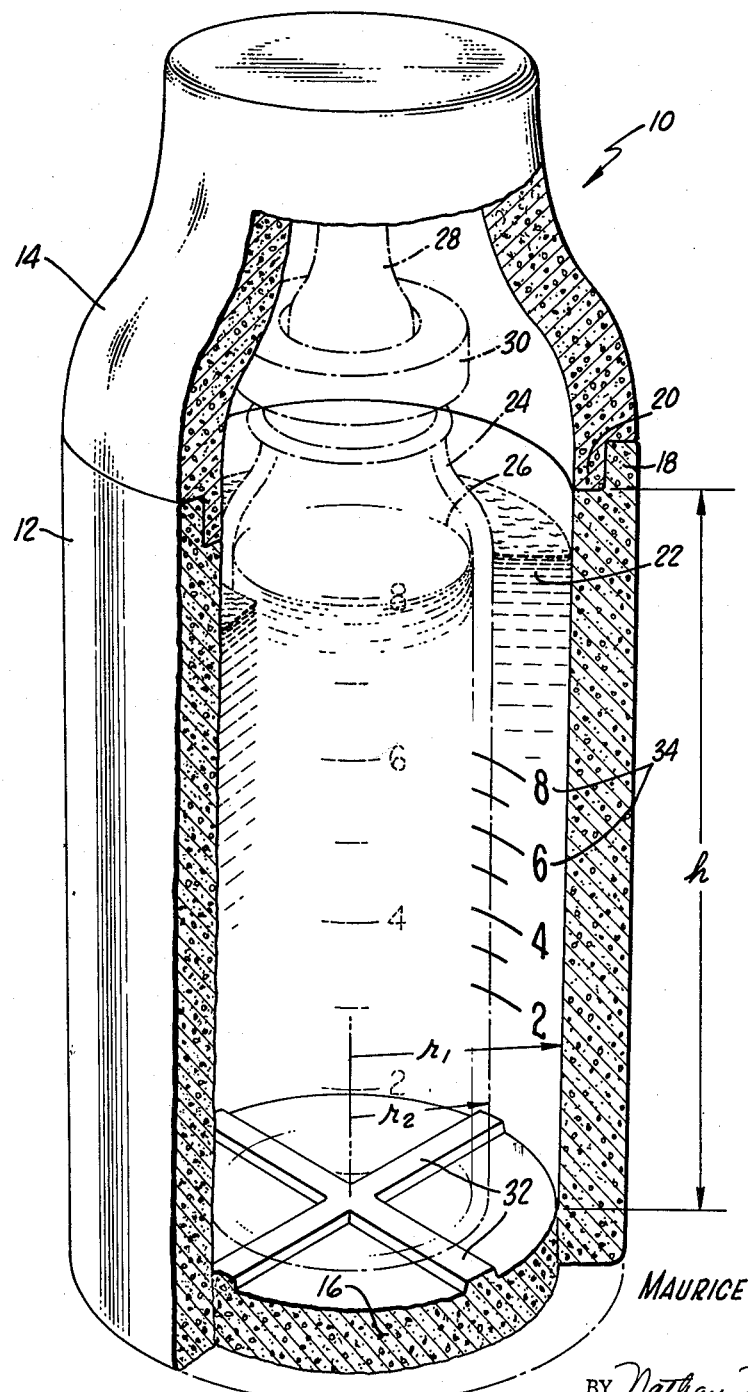

3,155,260
HEAT CONTROL DEVICE
Maurice W. Widener, 6509 Devonshire Drive,
San Jose, Calif.
Filed Dec. 20, 1960, Ser. No. 77,196
7 Claims. (Cl. 215—13)

This invention relates to a heat control device, and in particular to an improved means for quickly bringing a contained substance to a desired temperature, and for maintaining such substance at the desired temperature.

For the purpose of simplicity of explanation, the following description is directed particularly to the use of the heat control device of this invention for warming a baby milk bottle, for which the inventive device is especially applicable. However, it is to be understood that the scope of this invention is not limited to such use only. Also, all references to temperature will define degrees in Fahrenheit hereinafter.

In the prior art, milk which is contained in bottles for feeding infants is usually stored in a refrigerating environment, and maintained at a very low temperature, such as 35–40 degrees. When it is necessary to use the refrigerated milk to feed an infant, the milk must be heated rapidly to a temperature which will not bring discomfort to the infant. However, with presently known systems and devices for rapid heating of bottled milk, it is difficult to arrive at a proper temperature in a short time. Often the milk is overheated so that it must be cooled, or the milk is heated incrementally several times and needs to be checked often before it is brought to the desired temperature. Furthermore, many of these devices comprise several parts, require electric or other power supplies, are not waterproof, and are subject to breakage. Such devices and systems thus are lacking in efficiency, may be time consuming and costly, and have proven to be nuisances.

It is known that refrigerated milk is generally maintained at about 35–40 degrees. It is also known that the hot water which may be obtained from the conventional household water supply attains a temperature of approximately 140 degrees. It would be very desirable to utilize such easily accessible heat energy for heating a baby milk bottle if the heat transfer process can be rapid and controlled.

An object of this invention is to provide a heat control device which affords a quick heating of a contained body to a desired temperature, and which maintains said body at such temperature for a substantially long time.

Another object of the invention is to provide a heat control device for quick heating of a baby milk bottle which does not require electrical heating or other power supplies.

Another object is to provide a non-metallic, shock resistant, and water-proof container which affords rapid heating of a bottle of baby milk to a desired temperature by simple and economical means.

According to this invention, a heat control device which affords quick heating of a contained body, and maintains such body at a desired terminal temperature comprises a container member and a cooperating cap member, both formed from one and the same material. The configuration and dimensions of the container member are predetermined so that the volume of a heat energy providing substance which is added to the container member during the heating process bears a substantially fixed relationship to the volume of the body to be heated. The cap member and the container member are formed from a highly thermally insulating material having a low thermal coefficient (K factor) and a low specific heat, and when conjoined provide a substantially air sealed enclosure thermally insulated from ambient temperature conditions. By such means, rapid transfer of heat energy between the body and the heat energy providing substance is afforded for heating the body to a predetermined terminal temperature. Furthermore, the body is thereafter maintained at such temperature for a substantially long time.

In a particular embodiment of the invention, the cap member and the container member consist of a highly thermally insulating material having a low specific heat, such as an expanded polystyrene. The substance to be heated is a bottle of baby milk at a temperature of about 35–40 degrees, whereas the heat energy providing body is readily available household supply hot water at approximately 140 degrees. In accordance with this invention, the baby milk may be heated to a comfort temperature of about 96–98 degrees within approximately six minutes, and remains at such temperature for an extensive time.

The invention will be described in greater detail with reference to the sole figure of the drawing in which:

FIGURE 1 is a perspective view, in elevation, of a heat control device (with a portion broken away), in accordance with the invention.

In FIGURE 1, a heat control device comprises an enclosure 10 having a container member 12 and a cap member 14. The member 12 may be cylindrical having a closed end or base 16. The open end has an annular stepped portion 18 for accommodating the cap member 14, which has a complementary cooperating peripheral stepped portion 20 that seats closely on the stepped portion 18. When the members 12 and 14 are conjoined, a substantially airtight enclosure 10 is formed.

The container member 12 and the cap member 14 are made from an expanded polystyrene, such as the commercially available "Dylite," a trademarked product of the Koppers Company, Inc. The polystyrene has a very low thermal coefficient and a low specific heat. Therefore, there is substantially no interchange of heat energy between the internal environment of the enclosure 10 and the external surroundings when the members 12 and 14 are engaged.

To practice the invention, hot water 22 from a household faucet is permitted to run until it has attained its maximum temperature, which is generally 140 degrees. With a bottle 24 containing a quantity of milk 26 set within the container member 12, the hot water 22 is directed into the member 12 until the water 22 reaches a level substantially at the same height as the level of the milk 26. The cap member 14 is immediately seated on the container member 12 to provide a closely sealed enclosure 10 which conforms closely to the configuration of the bottle 24 and a nipple 28 fastened to the bottle by a threaded annulus 30 in a well-known manner.

Since the material forming the enclosure 10 has a very low specific heat, a very low thermal coefficient, and has a low permeability for water and water vapor, the heat interchange takes place practically between the bottle 24, the nipple 28, the milk 26 and the water 22 only. Furthermore, as the enclosure 10 conforms closely to the bottle 24, there is a minimum amount of air within the enclosure to affect the heat transfer process. Therefore, the interchange of heat energy between the milk 26 and the water 28 is rapid and controlled.

The enclosure 10 also has a raised ribbed portion 32 fabricated on the internal surface of the container base 16. When the vessel or bottle 24 is set on the ribbed portion 32, the bottom of the bottle 24 is spaced from the major surface of the container base 16. Such spacing provides more surface area of the bottle 24 for heat interchange. In addition, heat convection currents caused by the contact between the relatively cold bottle 24 and milk 26 and the hot water 22 traverse longer paths defined along the exterior of the cylindrical wall and under the base 16 of the bottle 24. Thus the heat transfer process is accelerated.

After the milk 26 and the water 22 have reached a terminal temperature at which there is thermal equilibrium, which would be the desired comfort temperauture of approximately 98 degrees, the temperature of the milk 26 remains substantially constant for many hours. Therefore there is no need for checking of the milk temperature, or reheating or recooling.

If it is assumed that the specific heat and the density of water are substantially the same as the specific heat and the density of milk, the amount of hot water at approximately 140 degrees that is needed to heat quickly a bottle of baby milk which is at about 40 degrees to a comfortable feeding temperature such as 98 degrees, may be determined. The heat transfer relationship is known to be as follows:

(1) $V_1(140° F.) + V_2(40° F.) = (V_1+V_2)(98° F.)$ where $V_1$ is the volume of hot water 22 in ounces; $V_2$ is the volume of the bottle 24, milk 26, nipple 28 and fastener 30 in ounces; and ° F. is the temperature in degrees Fahrenheit.

From Equation 1, it is seen that the volume of hot water $V_1$ should be approximately 1.4 times $V_2$. It has been determined that commercially available baby milk bottles, when assembled with the nipple and annular fastener, displace a volume of approximately 3 ounces. Therefore the additional volume of hot water required for the heating of the milk bottle only is about 4.2 ounces. If 8 ounces of milk is to be heated, then about 11.2 ounces of hot water at 140 degrees is necessary to heat the milk to 98 degrees.

It is also readily determined that for a given height $h$, (2) $V_1 = \Pi h(r_1^2 - r_2^2)$ where $r_1$ is the inner radius of the container member 12, and $r_2$ is the outer radius of the bottle 24. Since we know $r_2$, the radius of the baby bottle 24, and as we know the volume $V_2$ of milk to be heated, for example 8 ounces, then we may determine $V_1$ (approximately 15.4 ounces for 8 ounces of milk) and solve for the radius $r_1$ of the container member 12.

In a specific embodiment of the invention, the container member 12 was fabricated from "Dylite," an expanded polystyrene foam, having a thickness of about one-half inch and a density of 2.5 lbs. per cubic foot. The inner diameter of the container member 12 was about 3½ inches, the height of the cylindrical container member was approximately 5⅞ inches, with the inner shoulder of the stepped portion 18 being recessed about ⅜ inch.

The cap member 14 when seated on the container member 12 has a height of approximately three inches above the member 12 so as to accommodate the nipple 28 in close spaced relation.

In another form, indicia 34 may be marked on the inner wall of the container member 12, such indicia 34 corresponding to the volume of milk to be heated. Therefore, if it is desired to heat 8 ounces of milk to 98 degrees, the container member 12 is first filled with hot water at 140 degrees up to the level designated by the numeral 8 before the bottle 24 is placed in the member 12. When the bottle 24 is set into the member 12, the level of the water 28 rises to the proper height, which is just about the height of the milk 26. The position or level of the markings or indicia 34 may be determined by use of the relationships set forth heretofore. In one form, the numerical indicia may be disposed on the base 16 spaced in circular fashion, between the ribs 32, with corresponding level markers or height indicating protuberances registered vertically in a helical path on the inner cylindrical wall of the closure member 12.

Such indicia 34 are particularly useful when it is desirable to heat a small quantity of milk, such as two ounces by way of example. Also when plastic bottles which are not transparent are utilized to contain the milk, the use of the level indications which correspond to the necessary volume of hot water is desirable.

It is understood that the invention is not limited to the configuration illustrated herein. Also the invention is applicable to the use of any material having a very low coefficient of thermal conductivity and a very low specific heat, for controlling a heat transfer process in a simple, economical and convenient manner.

What is claimed is:

1. A highly thermally insulating enclosure for quickly heating a bottle containing a relatively cold liquid to a desired temperature, and for maintaining the liquid at such temperature for an extensive period, comprising in combination with a bottle: a cylindrical container member of a size to receive said bottle, said container membe having an open end and an end closed by a base, and having an annular stepped portion at its open end, and a raised ribbed portion on the interior of the base at its closed end for supporting said bottle in spaced relationship from said closed end; a cap member having a peripheral stepped portion for seating on the stepped portion of said container member so that when seated thereon a substantially airtight enclosure is formed, said container and cap members each being fabricated from a material having a very low coefficient of thermal conductivity and a low specific heat, the walls of said enclosure generally conforming to the shape of said bottle to be heated and being spaced from the bottle to provide a volume therebetween for receiving a known quantity of a heat energy providing substance sufficient to raise the temperature of a liquid contained within said bottle to a desired preselected temperature.

2. A heat control device as recited in claim 1, wherein said container member and said cap member are made from expanded polystyrene about one-half inch thick, and said container member has an inside diameter of approximately 3½ inches, and a height from the top of said base to the top of said open end of about 6 inches; and said cap member when seated on said container member having a height of approximately 3 inches above said container member.

3. A heat control device as recited in claim 1, including indicia markings disposed on said container member and referenced to the volume of liquid in the bottle so that the level of the heat energy providing substance required in said space may be quickly determined.

4. A device for effecting rapid interchange of heat between a substance contained within a vessel and having a first temperature and a liquid medium in contact with the exterior of said vessel and having a second temperature different from said first temperature to thereby achieve an intermediate temperature for said substance, and for maintaining said intermediate temperature comprising, in combination with a vessel: a substantially cylindrical, hollow container member closed at one end and open at its opposite end for reception of said vessel containing a volume of a substance initially having a first temperature, said container member having an internal diameter larger than that of said vessel to define an annular space therebetween for receiving a volume of a liquid medium initially having a second temperature different from said first temperature; a cap member receivable on said open end of said container member, said container member and said cap member being constructed from material having a very low thermal conductivity and a low specific heat and having interengaging edges forming an air-tight seal, the internal dimensions of said container member being proportioned relative to the external dimensions of said vessel so that when said annular space contains a volume of said liquid medium of the same height as the substance in said vessel, said first temperature of said substance will be automatically changed to a desired preselected temperature intermediate said first and second temperatures.

5. A device as recited in claim 4, wherein the internal dimensions of said container member are proportioned relative to the external dimensions of said vessel to generally satisfy the formula:

$$V_1(T_1) + V_2(T_2) = (V_1 + V_2)T_i$$

where:
- $V_1$ = the volume, by weight, of said vessel and the substance contained therein;
- $T_1$ = said first temperature;
- $V_2$ = the volume, by weight, of said liquid medium contained within said annular space;
- $T_2$ = said second temperature; and
- $T_i$ = said intermediate temperature.

6. A device as recited in claim 5, wherein said container member has vertically spaced indica therein corresponding to the volume of liquid medium required to obtain a desired intermediate temperature for a given volume of said substance.

7. A device as recited in claim 5, wherein said closed end of said container member has ribs on the inner side thereof to space said vessel therefrom, whereby to facilitate the flow of convection currents in said liquid medium.

References Cited in the file of this patent

UNITED STATES PATENTS

| | | |
|---|---|---|
| 1,772,339 | Cole | Aug. 5, 1930 |
| 2,808,090 | Casalino | Oct. 1, 1957 |
| 2,849,144 | Southwell | Aug. 26, 1958 |
| 2,994,448 | Sepe et al. | Aug. 1, 1961 |

FOREIGN PATENTS

| | | |
|---|---|---|
| 8,013 | Great Britain | 1887 |

OTHER REFERENCES

Publication: "Modern Packaging," July 1959.